United States Patent
Turner et al.

(10) Patent No.: US 6,744,900 B1
(45) Date of Patent: Jun. 1, 2004

(54) COMPLEX ACOUSTIC PATH AND GASKET FOR USE WITH MICROPHONES

(75) Inventors: Julia Carol Turner, Woodlawn (CA); Peter Craig, Kanata (CA); Philippe Moquin, Kanata (CA)

(73) Assignee: Mitel Knowledge Corporation, Kanata (CA)

( * ) Notice: Subject to any disclaimer, the term of this patent is extended or adjusted under 35 U.S.C. 154(b) by 214 days.

(21) Appl. No.: 09/660,947

(22) Filed: Sep. 13, 2000

(30) Foreign Application Priority Data

Sep. 14, 1999 (GB) ................................................ 9921556

(51) Int. Cl.[7] ................................................ H04R 11/04
(52) U.S. Cl. .................. 381/355; 379/428.01; 381/358; 381/365
(58) Field of Search ................................ 381/355, 359, 381/360, 361, 362, 363, 364, 365, 375, 370, 358; 379/430, 428.01, 429

(56) References Cited

U.S. PATENT DOCUMENTS

| 2,485,405 A | * | 10/1949 | Olney et al. ................ 381/359 |
| 4,263,484 A | | 4/1981 | Hisatsune et al. |
| 5,923,750 A | | 7/1999 | Enting et al. ................ 379/428 |

FOREIGN PATENT DOCUMENTS

| DE | 41 07 371 A1 | 9/1992 | |
| EP | 0 161 735 A2 | 11/1985 | |
| GB | 1 363 550 | 8/1974 | |
| GB | AG-2 064 263 A | * 11/1979 | ............ H04R/1/28 |
| GB | 2 064 265 A | 6/1981 | |
| WO | 98/20660 | 5/1998 | |

* cited by examiner

Primary Examiner—Curtis Kuntz
Assistant Examiner—Brian Ensey
(74) Attorney, Agent, or Firm—Staas & Halsey LLP

(57) ABSTRACT

A unitary gasket component is designed to provide a complex acoustic path for bringing sound to a microphone. The path includes a pre-plenum and apertures to allow external sound into the pre-plenum. The path further includes an acoustic filter communicating with the pre-plenum and defining relatively small openings for sound to exit the pre-plenum. A voice tube extends from the acoustic filter to a microphone plenum, the latter being in direct communication with the microphone.

5 Claims, 4 Drawing Sheets

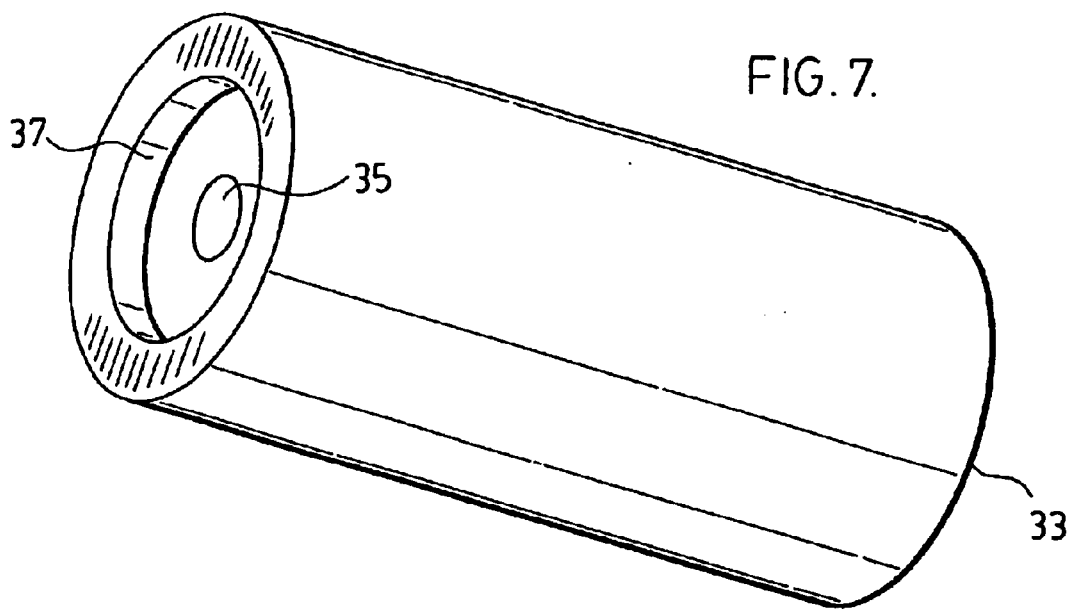
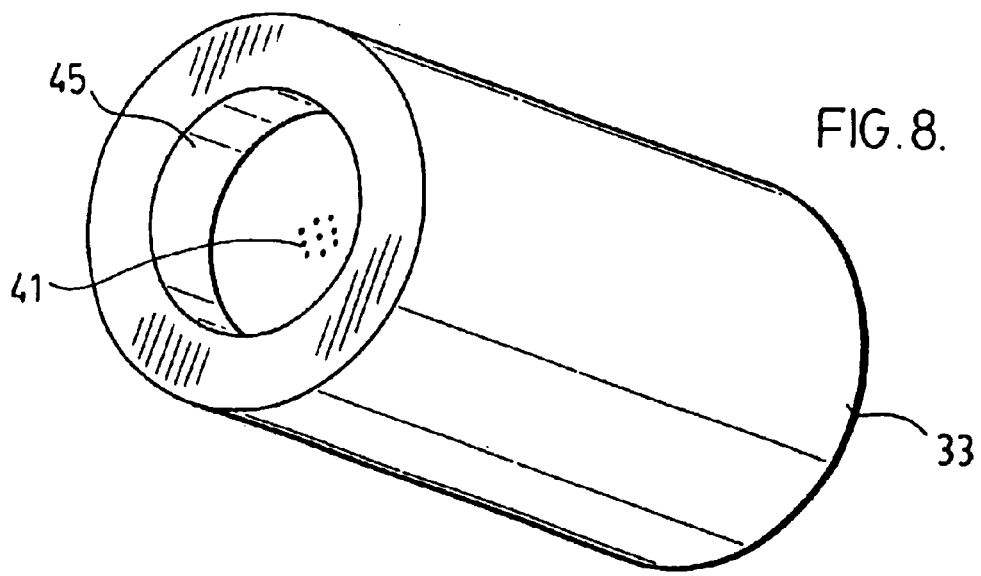

COMPLEX ACOUSTIC PATH AND GASKET FOR USE WITH MICROPHONES

This invention relates generally to telephone handsets, and has to do particularly with the acoustical path along which sound reaches the microphone.

BACKGROUND OF THIS INVENTION

For optimum sound reproduction, telephone handsets incorporate a somewhat complex acoustic path along which sound reaches the microphone, the path requiring complex geometries in the portions of the handset adjacent the microphone.

GENERAL DESCRIPTION OF THIS INVENTION

Generally, it is an aim of one aspect of this invention to incorporate the complex acoustic path geometry mentioned above into a simple, integral gasket, thus not requiring a plurality of pieces and components to have critical shapes.

More particularly, this invention provides a complex acoustic path for bringing sound to a microphone, the path comprising:

aperture means, a pre-plenum adapted to receive sound through said aperture means, an acoustic filter communicating with the pre-plenum and defining relatively small openings for sound to exit the pre-plenum, a voice tube extending away from said filter and adapted to receive sound from the filter, the voice tube terminating in a microphone plenum adjacent the microphone.

Furthermore, this invention provides a gasket for bringing sound from an aperture means to a microphone, the gasket defining a pre-plenum adapted to receive sound through said aperture means, an acoustic filter communicating with the pre-plenum and defining relatively small openings for sound to exit the pre-plenum, and a voice tube extending away from said filter and adapted to receive sound from the filter, the voice tube terminating in a microphone plenum adjacent the microphone.

Finally, this invention provides a method of delivering sound to a microphone, comprising the steps of:

admitting the sound to a pre-plenum, passing the sound from the pre-plenum through an acoustic filter defining relatively small openings for sound to exit the pre-plenum, receiving the sound at one end of a voice tube communicating with and extending away from said filter, passing the sound to the other end of the voice tube and there admitting the sound to a microphone plenum disposed adjacent the microphone.

GENERAL DESCRIPTION OF THE DRAWINGS

One embodiment of this invention is illustrated in the accompanying drawings, in which like numerals denote like parts, and in which:

FIG. 7 is a perspective view of the gasket of this invention, seen obliquely from one end; and FIG. 8 is a perspective view of the gasket of this invention, taken obliquely from the other end.

DETAILED DESCRIPTION OF THE DRAWINGS

Figure 1:
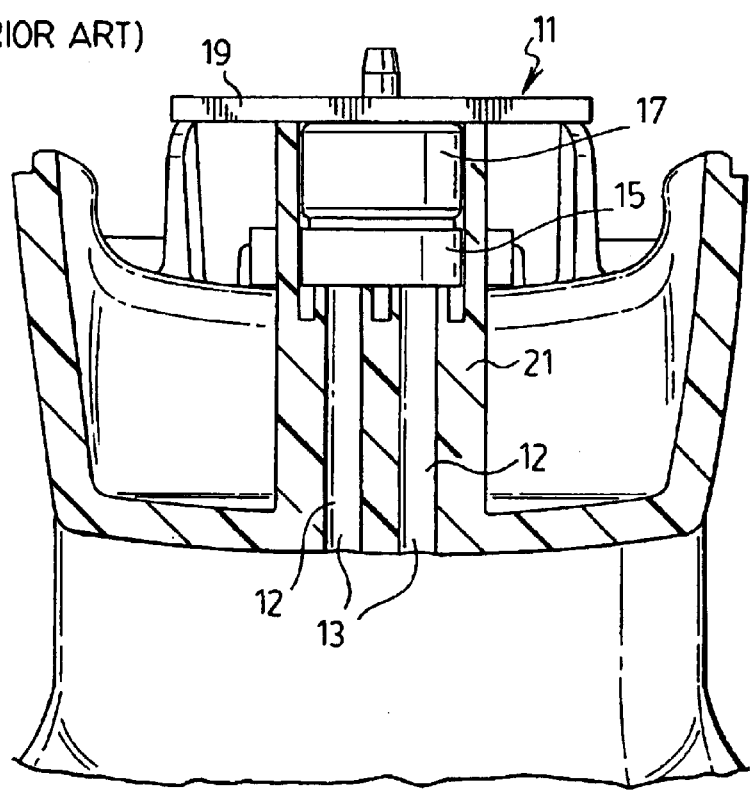
FIG. 1 is a sectional view through a portion of a handset, showing the prior art.

Attention is first directed to FIG. 1, which shows a sectional view through the microphone end of a typical telephone handset of the prior art, the section passing through two parallel, tubular passageways 12 which carry sound from respective openings 13 to one side of a cylindrical, solid gasket 15 which contacts the lower side of a microphone 17, the latter being sandwiched between the gasket 15 and a printed circuit board 19. As can be seen, a portion of the telephone handset defines a central tower 21 which contains the passageways 12, and provides at the top a substantially cylindrical recess for receiving the gasket 15 and the microphone 17. Typically, the microphone 17 is soldered in place against the printed circuit board 19.

Figure 2:
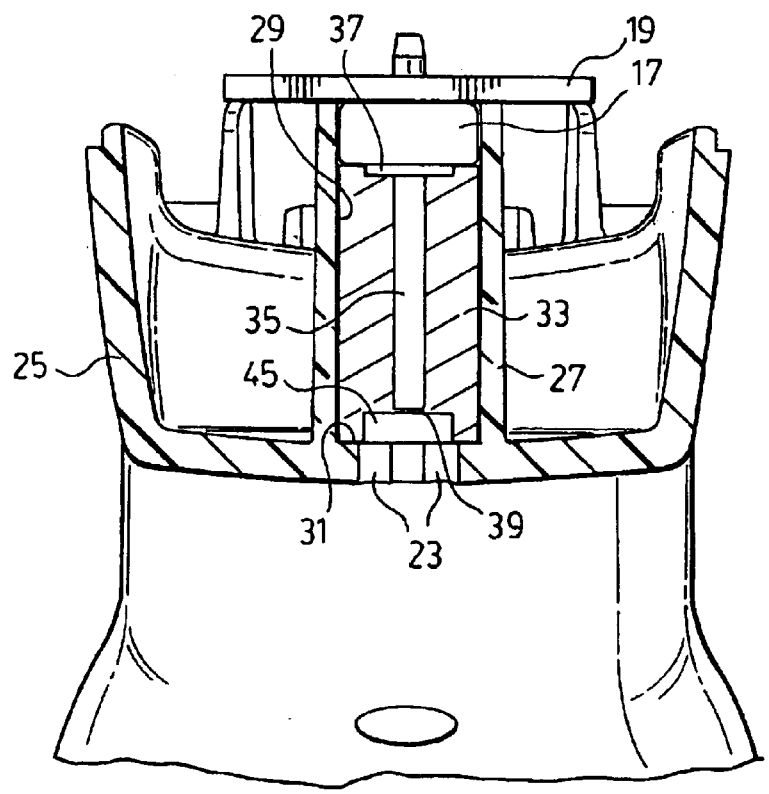
FIG. 2 is a sectional view similar to FIG. 1, but showing the gasket of the present invention in axial section.

Attention is now directed to FIG. 2, which illustrates the present invention. In FIG. 2, sound first enters through two openings 23, which may be called acoustic entry holes.

Extending integrally upwardly from a portion 25, defining part of the housing for the handset, is a microphone tower 27, which defines a cylindrical internal chamber 29. At the bottom end, the chamber 29 terminates in a flat wall 31. As can be seen, the openings 23 communicate the chamber 29 with the space outside the handset.

Looking simultaneously at FIGS. 2 and 3, the gasket of the present invention will now be described. In the Figures, the numeral 33 designates the gasket. A voice tube 35 extends coaxially along the gasket 33 between a microphone plenum 37 at the top end, and an acoustic filter 39 at the bottom end. The microphone plenum 37 is disc-shaped, with a diameter greater than that of the voice tube, with which it is coaxial. The acoustic filter 39, in the embodiment illustrated, consists of a cluster of small holes 41 extending through a relatively thin wall 43 separating the voice tube 35 from a pre-plenum 45.

It is therefore evident that a complex acoustic path, for bringing sound to a microphone, is provided beginning with the openings 23 which allow sound into the pre-plenum 45, the sound then traversing the acoustic filter 39 to reach the voice tube 35. The voice tube 35 terminates in the microphone plenum 37, to which it delivers the sound. The microphone plenum 37 is directly adjacent the microphone 17 (see FIG. 2).

Figure 3:
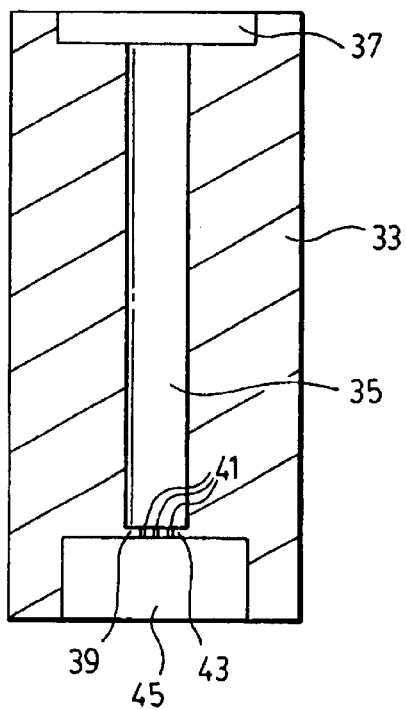
FIG. 3 is an axial sectional view of the gasket of this invention, drawn to a larger scale than that of FIG. 2.
Figure 4:
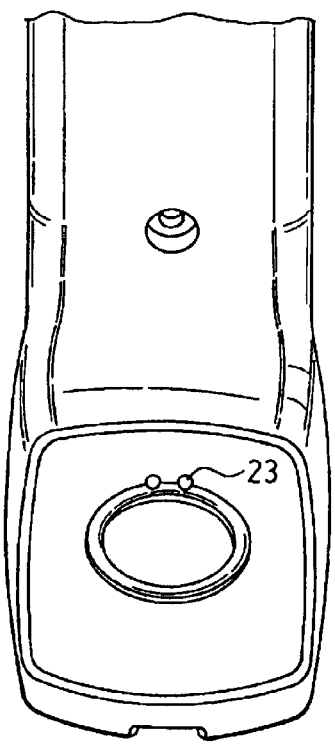
FIG. 4 is a perspective view of a handset, showing the positions of apertures which initiate the advantageous acoustic path provided herein.
Figure 5:
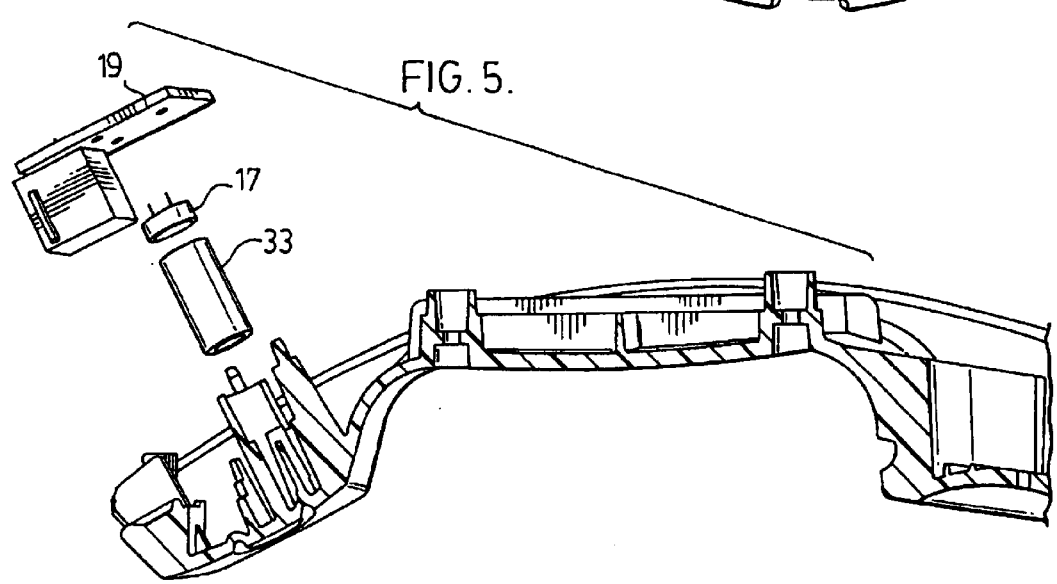
FIG. 5 is a sectional view taken through one end of a telephone handset, showing certain components in exploded relation.
Figure 6:
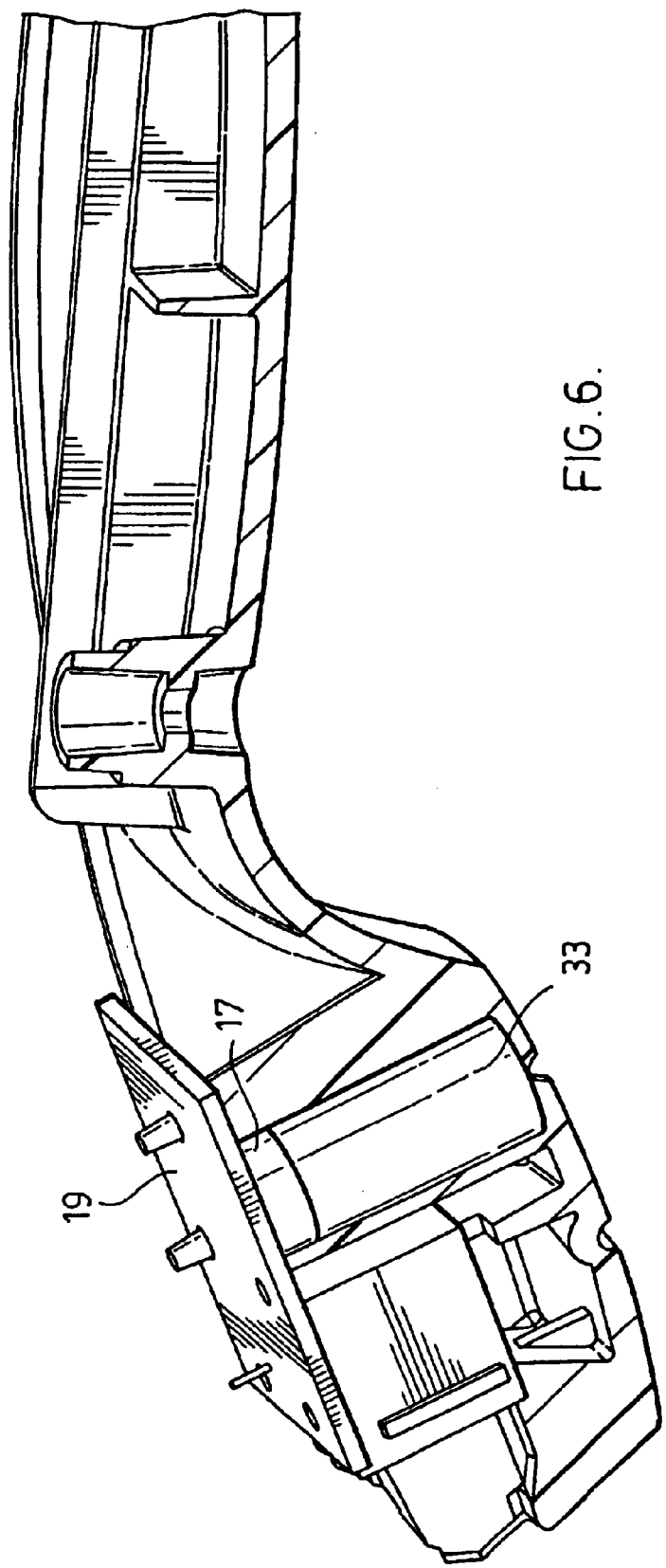
FIG. 6 is a partly sectional view of the end of a handset containing the gasket of this invention.

It is important that the microphone 17 achieve a good seal against the gasket 33 around the microphone plenum 37, and that a similarly tight seal exist between the bottom of the gasket 33 and the bottom wall 31 (see FIG. 3).

It is to be understood that the acoustic filter between the pre-plenum 45 and the voice tube 35 can have forms other than a cluster of small holes through a partition.

While one embodiment of this invention has been illustrated in the accompanying drawings and described hereinabove, it will be evident to those skilled in the art that changes and modifications may be made therein, without departing from the essence of the invention as set forth in the appended claims.

What is claimed is:

1. A gasket for bringing sound from an aperture to a microphone, the gasket defining a pre-plenum adapted to receive sound through said aperture, an acoustic filter communicating with the pre-plenum and defining relatively small openings for sound to exit the pre-plenum, and a voice tube extending away from said filter and adapted to receive sound from the filter, the voice tube terminating in a microphone plenum adjacent the microphone in which the pre-plenum, the filter, the voice tube and the microphone plenum are of integral construction and substantially in longitudinal alignment and in which the filter consists of a plurality of small holes extending through a relatively thin wall directly connecting the pre-plenum and the voice tube, the thin wall being an integral part of the gasket.

2. The combination of the gasket claimed in claim 1, with a telephone handset which includes the said microphone, said aperture being constituted by at least one opening communicating the pre-plenum with the ambience.

3. The combination claimed in claim 2, in which the pre-plenum, the voice tube and the microphone plenum are all substantially cylindrical and coaxial, and in which the aperture includes two openings.

4. The combination claimed in claim 1, in which the handset further includes a microphone tower defining an internal cylindrical chamber adapted to snugly receive the gasket and the microphone, the handset further including a printed circuit board disposed atop said tower, the microphone being sandwiched between the gasket and the printed circuit board.

5. A gasket for bringing sound from an aperture to a microphone, the gasket defining a pre-plenum adapted to receive sound through said aperture, an acoustic filter communicating with the pre-plenum and defining relatively small openings for sound to exit the pre-plenum, and a voice tube extending away from said filter and adapted to receive sound from the filter, the voice tube terminating in a microphone plenum adjacent the microphone in which the pre-plenum, the filter, the voice tube and the microphone plenum are substantially in longitudinal alignment and in which the filter comprises a plurality of small holes extending through a relatively thin wall directly connecting the pre-plenum and the voice tube.

* * * * *